United States Patent [19]
Rost

[11] Patent Number: 5,620,254
[45] Date of Patent: Apr. 15, 1997

[54] THERMAL DETECTOR MODULATION SCHEME

[75] Inventor: Martin Rost, Islip Terrace, N.Y.

[73] Assignee: Servo Corporation of America, Hicksville, N.Y.

[21] Appl. No.: 400,348

[22] Filed: Mar. 8, 1995

[51] Int. Cl.$^6$ ..................................... G01J 5/20
[52] U.S. Cl. ................................ 374/129; 374/121
[58] Field of Search .................... 374/32, 121, 129, 374/126, 128, 133, 163, 183, 130; 250/349, 338.1

[56] References Cited

U.S. PATENT DOCUMENTS

| | | | |
|---|---|---|---|
| 4,417,822 | 11/1983 | Stein et al. | 374/129 |
| 4,435,092 | 3/1984 | Iuchi | 374/129 |
| 4,576,486 | 3/1986 | Dils | 374/129 |
| 5,012,813 | 5/1991 | Pompei et al. | 374/130 |
| 5,100,243 | 3/1992 | Grosskopf et al. | 374/121 |
| 5,178,464 | 1/1993 | Fraden | 374/129 |
| 5,331,311 | 7/1994 | Doctor | 374/129 |
| 5,455,424 | 10/1995 | Doctor | 250/349 |
| 5,477,052 | 12/1995 | Doctor | 250/349 |

FOREIGN PATENT DOCUMENTS 57-160029  10/1992  Japan ..................... 374/129

*Primary Examiner*—G. Bradley Bennett
*Attorney, Agent, or Firm*—Kane, Dalsimer, Sullivan, Kurucz, Levy, Eisele and Richard, LLP

[57] ABSTRACT

The apparatus is a thermal detector which uses an active detector element and a compensator detector element, particularly in a voltage divider configuration. Radiation from a scene of interest impinges on the active detector element and radiation from an electronically modulated light source impinges on the compensator detector element.

7 Claims, 1 Drawing Sheet

INCOMING RADIATION FROM SCENE

SIGNAL WITH ONLY ACTIVE ELEMENT ILLUMINATED (VIEWING SCENE)

SIGNAL WITH ONLY COMPENSATOR ELEMENT ILLUMINATED

SIGNAL WITH ONLY COMPENSATOR ELEMENT ILLUMINATED +ACTIVE VIEWING SCENE. NO MODULATION

SIGNAL WITH ACTIVE VIEWING SCENE AND COMPENSATOR ILLUMINATED WITH MODULATED RADIATION

THERMAL DETECTOR MODULATION SCHEME

BACKGROUND OF THE INVENTION

1. Field of the Invention

The invention pertains to a thermal detector, particularly a thermistor bolometer operating in the infrared domain, wherein modulation of the output is achieved electronically rather than mechanically.

2. Description of the Prior Art

In the prior art, the use of thermal detectors, such as thermistor bolometers, is well-known. Common applications are satellite guidance systems such as disclosed in patent application Ser. Nos. 08/227,270 (U.S. Pat. No. 5,455,429) entitled "Earth Sensor for Satellites" and 08/229,460 (U.S. Pat. No. 5,477,052) entitled "Earth Sensor for Satellites with Radiance Compensation", or detection of overheated railroad bearings such as disclosed in U.S. Pat. Nos. 5,100,243 and 5,331,311, all commonly-owned with the present application.

Thermal detectors, particularly thermal bolometers working in the infrared domain, are used in two modes, either staring or chopped. Each mode has its strong points and limitations. The chopped mode requires a mechanical chopper to periodically interrupt the incident radiation. The chopper, a mechanical device, is subject to failure. The chopped mode provides an AC output which simplifies the electronics in terms of noise control and signal amplification. The staring mode does not employ a chopper but requires greater care in signal processing because it provides a d.c. signal.

OBJECTS AND SUMMARY OF THE INVENTION

It is therefore an object of this invention to provide a thermal detector, particularly a thermistor bolometer operating in the infrared domain, which has an Ac output in response to incident radiation.

It is therefore a further object of this invention to provide a thermal detector, particularly a thermistor bolometer operating in the infrared domain, which eliminates the chopper or similar mechanical devices while retaining an AC output in response to incident radiation.

These and other objects are achieved by a thermal detector, particularly a thermistor bolometer operating in the infrared domain, using a pair of bolometer elements—one active and one compensator—and a modulated light source. The radiation from the scene of interest strikes the active element and radiation from the modulated light source strikes the compensator element.

In operation, the active element views a scene and the infrared energy from the scene causes the bolometer to increase in temperature causing the resistance of the bolometer to decrease. This in turn increases the output signal. By directing radiation from the modulated light source to the compensator element, the signal from the active element can effectively be nulled.

The radiation on the compensator element from the modulated light source is modulated "ON" and "OFF". When the radiation is "OFF" there will be a DC signal response due to the active element, and when the radiation is "ON", there will be a DC signal response due to the difference between the resistances of the compensator and active elements. By modulating the radiation on the compensator, an asymmetric AC signal is output. The negative going component of the AC signal represents the active element output while the positive going output is discarded. In practice, the output signal would be detected with a phase locked loop circuit which is synchronized to the pulsed radiation source.

BRIEF DESCRIPTION OF THE DRAWINGS

Further objects and advantages of the invention will become apparent from the following description and claims, and from the accompanying drawings, wherein:

DETAILED DESCRIPTION OF THE PREFERRED EMBODIMENT

Figure 1:
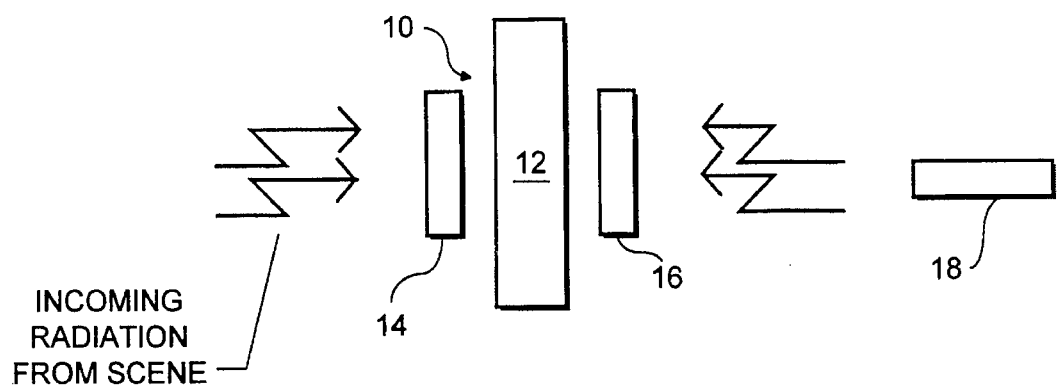
FIG. 1 is a schematic of the thermal detector of the present invention.

Referring now to the drawings in detail wherein like numerals refer to like elements throughout the several views, one sees that FIG. 1 is a schematic of the thermal detector 10 of the present invention.

On a common substrate 12, an active element 14 and a compensator element 16 are placed. Both active element 14 and compensator element 16 are bolometers which are responsive to incident radiant energy, such as infrared radiation. In the preferred mode, incident infrared energy from the scene causes the active element (bolometer) 14 to increase in temperature causing the resistance of the active element 14 to decrease. Likewise, incident radiant energy from the modulated light source 18 causes the compensator element (bolometer) 16 to increase in temperature causing the resistance of the compensator element 16 to decrease. The active element 14 and the compensator element 16 are shielded such that neither receives the radiation that the other receives.

Modulated light source 18 generates a flashing-type signal, typically with a square-wave intensity. A square-wave configuration can be achieved electronically rather than mechanically, such as is well-known to those skilled in the art.

Figure 2:
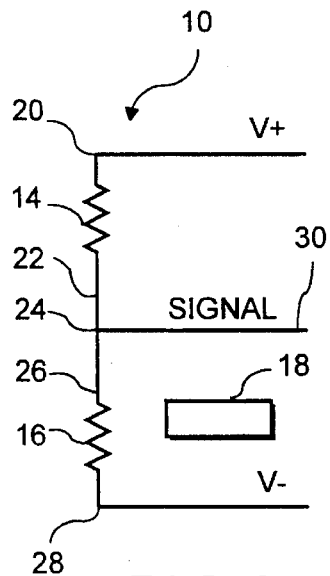
FIG. 2 is an electrical schematic of the thermal detector of the present invention.

FIG. 2 is an electrical schematic of thermal detector 10 of the present invention. By use of a power supply (not shown) a positive voltage V+ is applied to a first side 20 of active element 14. Likewise, a negative voltage V− is applied to a first side 28 of compensator element 16. Second side 22 of active element 14 and second side 26 of compensator element 16 join at node 24 thereby forming a voltage divider-type configuration from which line 30 carries the resulting signal of thermal detector 10.

In operation, as the active element 14 views a scene, the radiation (particularly infrared energy) from the scene causes active element 14 to increase in temperature causing the resistance of active element 14 to decrease. This decrease in resistance changes the voltage division and causes the voltage signal from node 24 via line 30 to increase (that is, move toward V+ as the resistance of active element 14 and the voltage thereacross decreases thereby increasing the voltage across compensator element 16). Likewise, the radiation (particularly infrared energy) from modulated light source 18 causes compensator element 16 to increase in temperature causing the resistance of compensator element 16 to decrease. This decrease in resistance changes the voltage division and causes the voltage signal from node 24 via line 30 to decrease (that is, move toward V− as the resistance of compensator element 16 and the voltage thereacross decreases).

The radiation on the compensator element 16 from modulated light source 18 is modulated "ON" and "OFF", typically in a flashing or square-wave configuration. A square wave can be achieved electronically rather than mechanically as is known in the prior art. When the modulated light source 18 is "OFF", there will be a DC signal from node 24 via line 30 due to the active element 14, and when the modulated light source 18 is "ON", there will be a DC signal from node 24 due to the difference between the resistances of the active element 14 and the compensator element 16. The modulation of light source 18, "ON" and "OFF", on compensator element 16 produces an asymmetric AC signal output. The negative going component of the AC signal at node 24 represents the active element output. The positive going output is discarded.

For thermal detector 10 to work properly, the active and compensator elements 14, 16 should be closely matched in resistance so that there is a zero output (that is, an equal voltage division between V+ and V−) when no scene is viewed. This can also be achieved by adjusting the bias voltage.

Figure 3A:
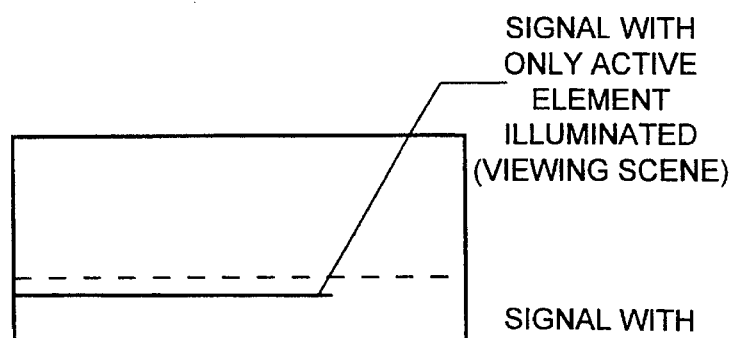
FIGS. 3a, 3b and 3c illustrate the output from various thermal detector configurations, including those of the device of the present invention.
Figure 3B:
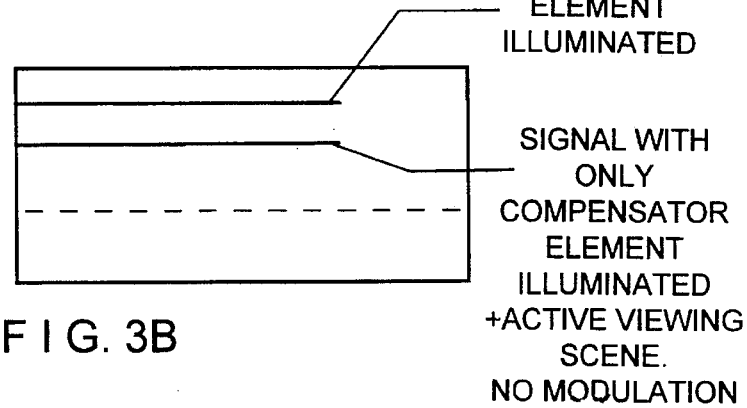
Figure 3C:
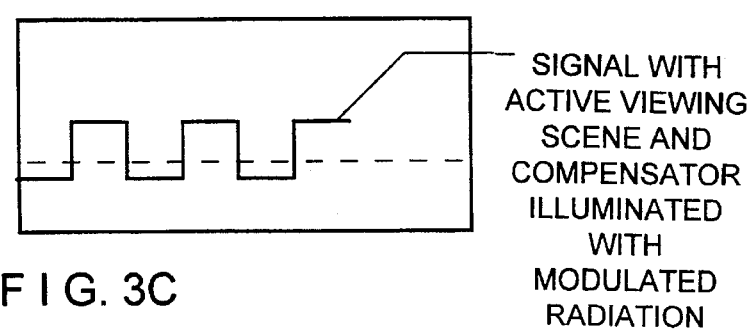

FIG. 3a is illustrative of the output of the active element 14 only. FIG. 3b is illustrative of the output of the compensator element 16 with no scene being viewed by active element 14 and the output of the compensator element 16 with a scene viewed by active element 14 but with no modulation. FIG. 3c is illustrative of the output of thermal detector 10 with an active scene viewed on active element 14 and modulated light source 18 viewed on compensator element 16.

This concept can be employed with a wide range of thermal detectors and is not limited to thermistor bolometers.

To use thermal detector 10, the user orients thermal detector 10 so that active element 14 is oriented toward the scene of interest and receives radiation therefrom. The user should then adjust the frequency and intensity of modulated light source 18 as is appropriate for the application.

Thus the several aforementioned objects and advantages are most effectively attained. Although a single preferred embodiment of the invention has been disclosed and described in detail herein, it should be understood that this invention is in no sense limited thereby and its scope is to be determined by that of the appended claims.

What is claimed is:

1. A thermal detector including:

an active detector element which detects radiation from a scene of interest;

a modulated light source;

a compensator detector element which detects radiation from said modulated light source; and a modulated output which is responsive to an output of said active detector element as compensated by an output of said compensator detector element.

2. The thermal detector of claim 1 wherein said modulated light source is modulated electronically.

3. The thermal detector of claim 2 wherein said active detector element and said compensator detector element change resistance in response to the intensity of radiation impinging thereon.

4. The thermal detector of claim 3 wherein said active detector element and said compensator detector element are thermistor bolometers particularly responsive to infrared radiation.

5. The thermal detector of claim 4 wherein said active detector element and said compensator detector element are configured as resistors in a voltage divider.

6. The thermal detector of claim 5 wherein a voltage of a given magnitude and a given polarity is applied to a first end of said active detector element; a voltage of said given magnitude and a polarity opposite said given polarity is applied to a first end of said compensator detector element; a second end of said active detector element and a second end of said compensator detector element are joined at a common node; and wherein a voltage signal from the thermal detector is measured from said common node.

7. The thermal detector of claim 6 wherein said active detector element and said compensator detector element are configured on a common substrate.

\* \* \* \* \*